United States Patent [19]

Stanisz

[11] Patent Number: 5,128,511
[45] Date of Patent: Jul. 7, 1992

[54] WELDING APPARATUS AND TRANSFORMER THEREFOR

[75] Inventor: Jan Stanisz, Lacko, Poland

[73] Assignee: Pulsair Anstalt, Vaduz, Liechtenstein

[21] Appl. No.: 646,265

[22] Filed: Jan. 28, 1991

Related U.S. Application Data

[63] Continuation-in-part of Ser. No. 476,040, Feb. 6, 1990, Pat. No. 5,030,813.

[51] Int. Cl.⁵ .................................... B23K 11/26
[52] U.S. Cl. .................... 219/116; 219/81; 219/113
[58] Field of Search ............ 219/113, 108, 116, 81; 336/175, 213, 219

[56] References Cited

U.S. PATENT DOCUMENTS

| | | | |
|---|---|---|---|
| 1,273,203 | 7/1918 | Thomson | 219/116 |
| 1,362,962 | 12/1920 | Redfield et al. | |
| 2,428,390 | 10/1947 | Smith | 219/113 |
| 2,644,067 | 6/1953 | Watson | |
| 2,947,960 | 8/1960 | Frederickson | |
| 3,154,757 | 10/1964 | Hannon | 336/175 |
| 3,211,885 | 10/1965 | Fischer | 219/116 |
| 3,436,514 | 4/1969 | Broomhall et al. | 219/113 |
| 4,496,821 | 1/1985 | Burgher et al. | 219/116 |
| 4,694,140 | 9/1987 | Wheeler et al. | 219/130.1 |
| 4,814,736 | 3/1989 | Lee et al. | 336/213 |

FOREIGN PATENT DOCUMENTS

| | | | |
|---|---|---|---|
| 43-10214 | 4/1968 | Japan | 219/113 |
| 432993 | 12/1974 | U.S.S.R. | 219/113 |

OTHER PUBLICATIONS

PCT Search Report for PCT/ep90/00339.

*Primary Examiner*—Clifford C. Shaw
*Attorney, Agent, or Firm*—Norman St. Landau

[57] ABSTRACT

A welding apparatus is disclosed to include an electrically insulating casing, first and second welding electrodes, and one or more welding transformer cores having toroidal cores, multi-turn primary windings and a single-turn secondary winding. The cores include a grain-oriented silicon steel material coiled with an insulator. The primary windings have turns axially wound about the cores. The secondary windings include at least two conductive arm sections which are connected to the electrodes and a wound section including conductive wire cable which electrically connects the two arm sections. One of the arm sections can provide the frame member to support the transformer. The apparatus is suitable for spot or linear welding.

20 Claims, 9 Drawing Sheets

WELDING APPARATUS AND TRANSFORMER THEREFOR

RELATED APPLICATION DATA

This application is a continuation in part of copending U.S. application Ser. No. 07/476,040, filed Feb. 6, 1990, now U.S. Pat. No. 4,030,813, which application is relied upon and incorporated herein by reference.

BACKGROUND OF THE INVENTION

The present invention pertains to an apparatus for spot welding or linear welding. More particularly, the present invention pertains to a lightweight spot welding and/or linear welding apparatus which protects against electric shock and features a transformer formed of one or more toroidal cores, primary windings wound axially about the core or cores, and a single-turn secondary winding comprising at least two arm sections which are electrically connected by a wound elements.

In conventional welding apparatus, emphasis has been placed in developing particular features to make such an apparatus better suited for various applications. For example, U.S. Pat. No. 3,211,885 states that the commercial applicability of a portable welding tool depends upon the ease with which the tool may be used, and goes on to disclose a welding system including a capacitor discharge circuit for accommodating different sizes or gauges of material or wire to be welded. U.S. Pat. No. 2,269,726 relates to a manual welder which is described as light in weight. U.S. Pat. No. 4,496,821 states that, due to their mass, conventional spot welder transformers are not well suited for use with, for example, a robot arm, and goes on to disclose a lightweight transformer adapted for use with a welding gun mounted at the end of a robot arm. U.S. Pat. No. 2,491,169 is directed to a relatively lightweight welding means which incorporates a transformer containing little or no iron, but which permits a relatively large throat.

SUMMARY OF THE INVENTION

The present invention relates to a spot welding apparatus and a linear welding apparatus which offers excellent protection against electric shock. According to the present invention, the transformer core or cores and the primary windings are coated with a synthetic resin and encased in an insulating material to electrically insulate them, and to make them moisture resistant. The casing walls of the welding machine of the invention likewise comprise electrical insulation to protect the operator from electrical shock. In a preferred embodiment of a spot welding apparatus in accordance with the invention, a stationary conductive arm provides the mounting for one of the welding electrodes and further provides the frame structure for the apparatus. One or more welding transformer cores are supported upon such stationary arm. This preferred arrangement permits further reduction of the ultimate weight of the welding device.

According to the invention, a welding transformer is provided, having one or more toroidal cores formed of a silicon steel strip coiled or rolled with an insulating material, multi-turn primary windings, and a single-turn secondary winding. The rolled or coiled core avoids high magnetic resistances and high eddy current losses and reduces core losses to 0.8 watts/kg. A primary winding is wound axially or lengthwise about each toroidal core. The secondary winding comprises one or more movable arm sections, the fixed arm section which also acts as the frame, and wound elements which electrically connect the arms. A portion of the stationary arm extends axially through the transformer core or cores, adjacent to internal primary winding sections therein, to support each core and to form a single-turn about each core.

The transformer is energized by power released from a capacitor-based storage circuit. The output of a power supply is rectified by rectifying means, in order to provide a current suitable for charging the capacitor. An inductor acts as a choke to restrict the electricity charging the capacitor. When the capacitor is sufficiently charged, a switch connects the capacitor with the transformer, and the energy stored in the capacitor is transferred to the transformer for welding.

BRIEF DESCRIPTION OF THE DRAWINGS

Further aspects and features of the present invention will be even more apparent from the following detailed description and drawings, and the appended claims. In the drawings:

DETAILED DESCRIPTION OF THE PREFERRED EMBODIMENTS

Figure 1:
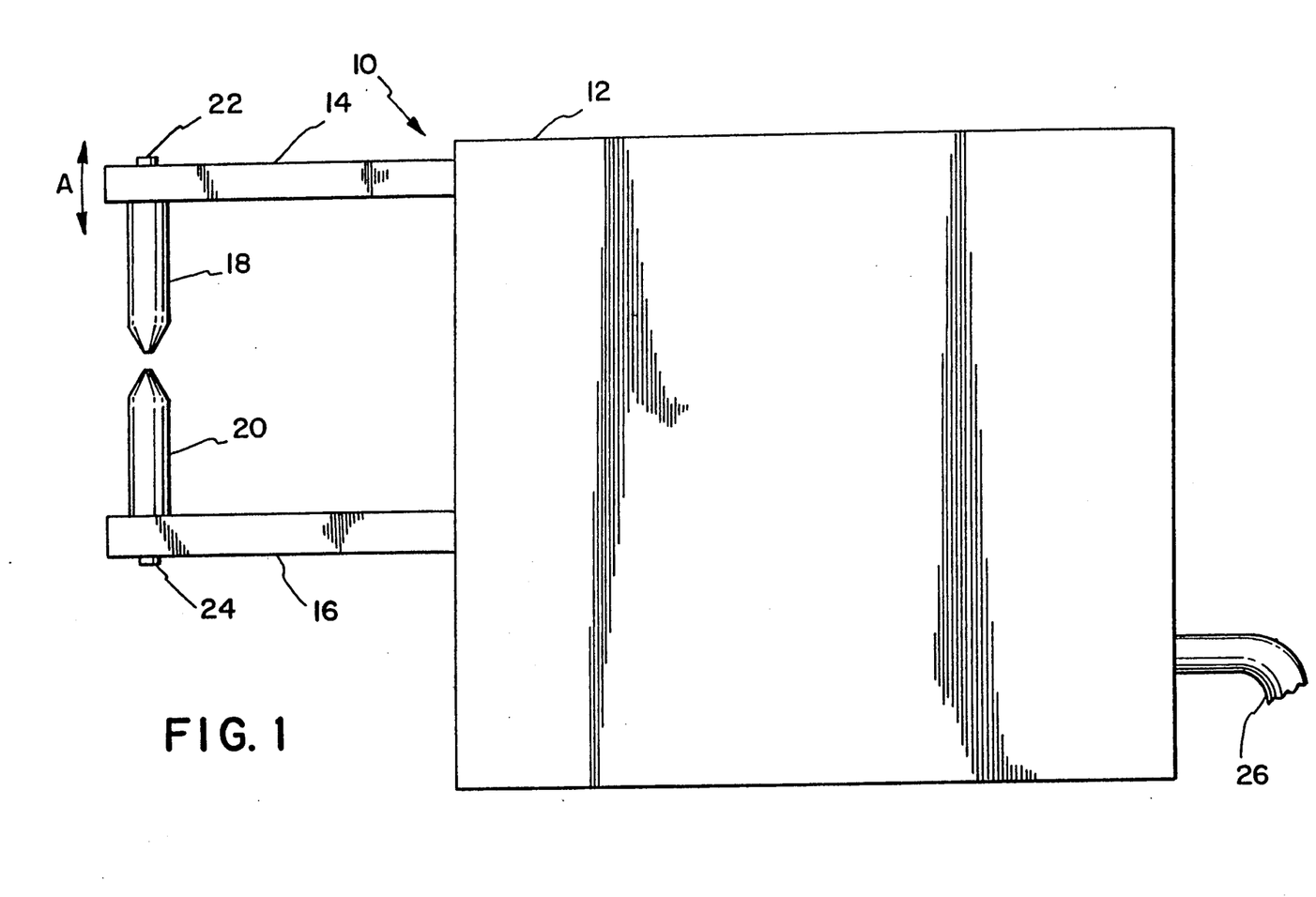
FIG. 1 is an elevated side view of a welding apparatus in accordance with the present invention.

FIG. 1 is an elevated side view of a spot welding apparatus 10 in accordance with the present invention. Spot welding apparatus 10 features a body or case 12 which is constructed from a material that has good electrical insulating properties such as, for example, TEXTOLITE (registered trademark of General Electric Co.), to provide protection against electrical shock as a result of the high currents generated by the apparatus. Protruding out of the case 12 are two copper arms 14 and 16. In the embodiment of FIG. 1, copper arm 14 is journaled to move within the plane of the paper as indicated by double headed arrow A to accommodate positioning of the work piece (not shown in the drawings) between the welding electrodes 18 and 20. Copper arm 16 is fixed. It is contemplated that a pneumatic system (not shown), operating under an internal pressure of about six atmospheres, could be used to move arm 14, and thereby press the work piece between the welding electrodes. Also, it is understood that either arm could be journaled for movement, or that both arms may be made movable. It also is contemplated that other conductive materials may be used to form arms 14 and 16.

Preferably, point electrodes 18 and 20 are formed of copper. Electrodes 18 and 20 may be affixed on arms 14 and 16 in any conventional way, such as by fasteners 22 and 24, to provide good electrical contact between each electrode and its respective arm. Preferably, the copper electrodes 18 and 20 are of the water-cooled type. Hoses for circulating coolant for the electrodes are not shown in the drawings. A power cable 26 extends from the rear of housing 12 for connecting the welding unit 10 to an external power supply, such as a 220 volt, 50 Hz supply.

Figure 2:
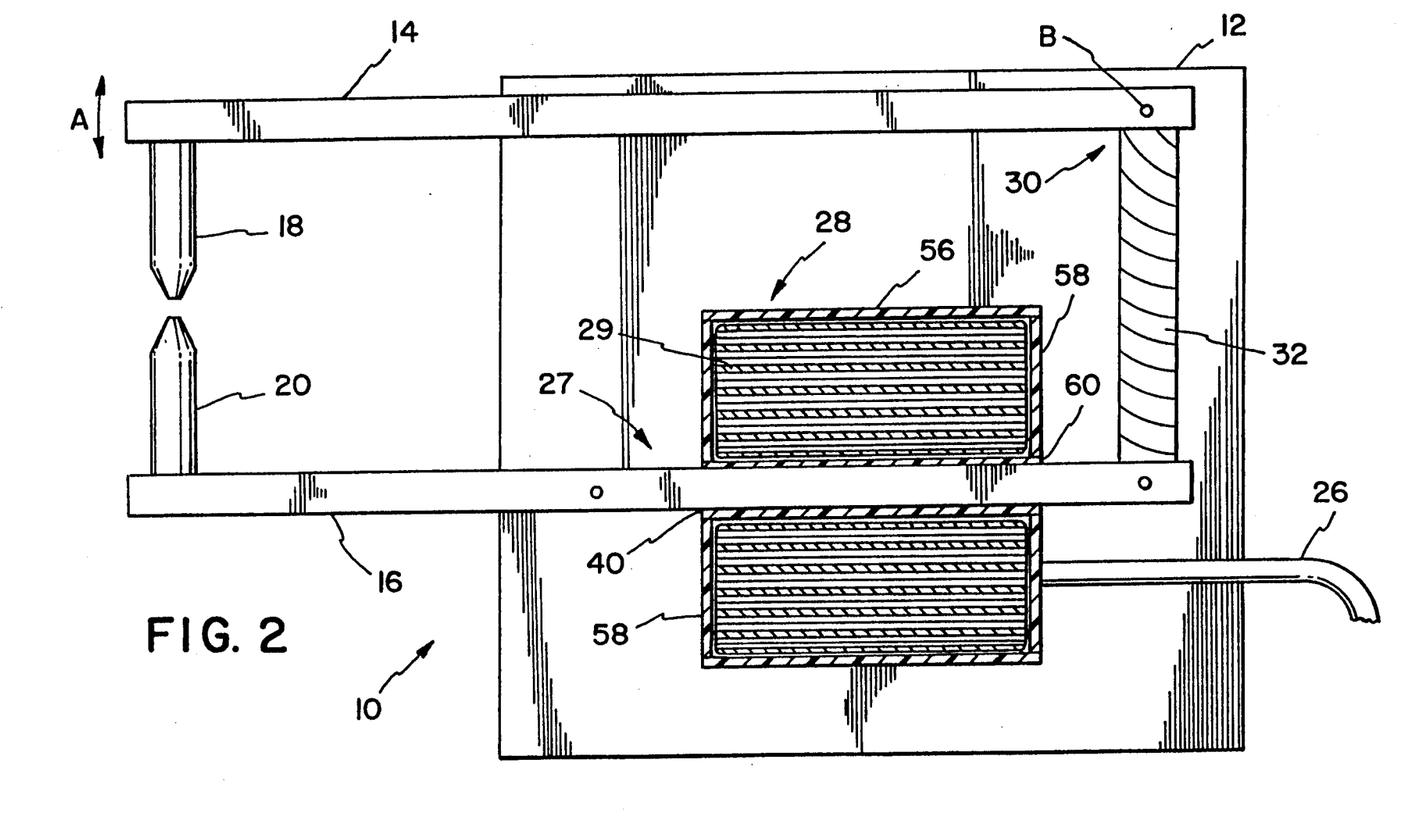
FIG. 2 is a side sectional view of a welding apparatus of FIG. 1.

FIG. 2 is a side view of the spot welding apparatus 10, with a side wall of the casing 12 removed to feature the electrical and magnetic circuits therein. In FIG. 2, there is shown a transformer generally identified by reference numeral 27. Transformer 27 comprises a core 28, a primary winding 29, and a secondary winding 30, which in turn comprises arms 14, 16 and a connecting wound means 32. The transformer 27 and the primary and secondary windings 29, 30 provide a potential difference between electrodes 18 and 20. As will be described in more detail with regard to FIGS. 12 and 13, two or more transformer cores may be used in the welding apparatus in accordance with other embodiments of this invention. All of the transformer cores used in conjunction with this invention are of the type described herein.

Figures 3, 4, 5:
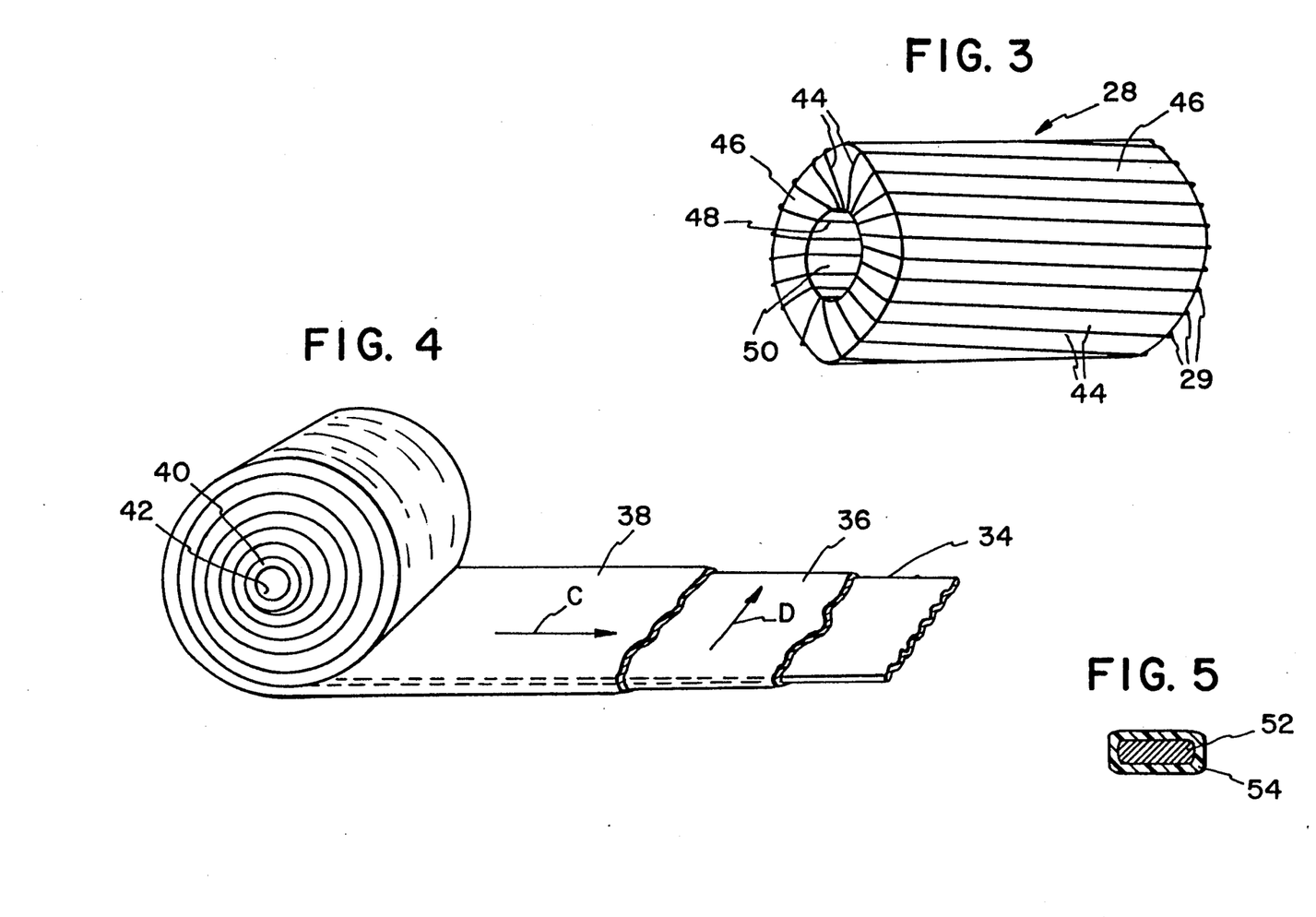
FIG. 3 is a perspective view of a transformer core together with a primary winding thereon, which core and winding are suitable for use with the welding apparatus in accordance with the invention.
FIG. 4 is a perspective view of a silicon steel tape together with layers of electrical insulation which are rolled to form the core shown in FIG. 3.
FIG. 5 is a sectional view of an insulated primary winding.

With reference also to FIGS. 3 and 4, preferred transformer core 28 is constructed from a highly grain-oriented silicon strip or tape 34. The strip or tape 34 is conventional and comprises a cold-rolled silicon steel material which is grain-oriented so that the magnetic induction in the direction that the strip is rolled or coiled, as indicated by arrow C in FIG. 4, is 1.7 tesla (17,000 gauss). The magnetic induction in the direction transverse to the rolling direction, as indicated by arrow D, is 1.0 tesla (10,000 gauss). Strip 34 is encased within insulating layers 36 and 38. Layer 36 comprises any conventional electrical insulation and layer 38 comprises a tape to secure the insulation layer 36 about the strip 34. It is contemplated that a cotton tape comprising both layers 36 and 38 could be conveniently used to envelope the strip material 34. As understood from FIG. 4, the insulated silicon strip 34 is coiled or rolled to form the toroidal transformer core 28. It may be preferred that the insulated strip be rolled upon a pressboard tube 40 or the like, for easily forming an axial passage 42 through the core 28. The silicon steel strip 34 may be adhered to the pressboard center by the tape 38.

As a result of the rolled or coiled configuration of strip material 34 and its insulating layers 36 and 38, the magnetic flux flows in the direction of maximum magnetic induction. Further, the rolled core 28 in accordance with the present invention avoids high magnetic resistances and high losses due to eddy currents which commonly arise in composite core structures. Core 28 is characterized by power losses of no more than 0.8 watts/kg due to hysteresis and eddy currents.

The primary winding 29 of the transformer is wound axially about the core 28, as best shown in FIG. 3. As such, primary winding 29 is considered to have external winding sections 44 that are adjacent to the outer walls 46 of the core 28, and internal winding sections 48 adjacent the inner walls 50 of the core. In a preferred embodiment, toroidal core 28 has a cross-sectional area of 58.5 cm². The number of turns of the primary winding 29 is given by $$Z = \frac{u}{4.44 \times B \times S \times f}$$

where u is the supply voltage in volts, S is the cross-sectional area of the core 28 in cm², and f is the frequency of the supply voltage in hertz. By substituting the appropriate values, we get $$Z = \frac{220}{4.44 \times B \times 58.5 \times 50} \; 110 \text{ turns}$$

With reference to FIG. 5, primary winding 29 comprises a copper strip 52 enclosed by glass fiber insulation 54. The dimensions of the copper strip 52 forming preferred primary winding 29 are 1 mm ×3 mm whereby the strip has a cross-sectional area of 3 mm². It is contemplated that other electrically conductive windings may be used for the primary winding without departing from the invention. Once the primary winding 29 has been wound about the core 28, the core and the primary winding are coated with a spirit-based insulating lacquer. Thereafter, the core 28 and primary winding 29 are dried at 60° C.

The transformer core 28 is encased in a polyvinylchloride (PVC) tube 56 which is closed at each of its ends by electrically insulating disks 58, which likewise could comprise TEXTOLITE. Further, a thin PVC tube 60 is received within the opening 42 through the toroidal transformer core 28, to cover the internal sections 48 of the primary winding 29. Any interstices between the tubes 56, 60, the coated core 28 and winding 29, and the disks 58 are filled with a conventional epoxy resin. The composite core and primary winding structure in accordance with the invention are made moisture resistant. This resulting structure is not only water resistant, but resists many other agents as well. Furthermore, the composite core according to the invention is electrically insulated to prevent electrical shock.

In a preferred embodiment of the invention, the external diameter of the outer PVC pipe 56 is about 160 mm and the inside diameter about 152 mm. This corresponds to a pipe wall thickness of 4 mm. The end disks 58 have a 152 mm outside diameter so that they fit within the PVC pipe 56. Each disk 58 has an opening at its center which is 35 mm in diameter to receive inner PVC tube 60. Inner tubular member 60 has a 35 mm outside diameter and a 29 mm inside diameter whereby its wall thickness is 3 mm.

With particular reference again to FIG. 2, the secondary winding 30 comprises copper arms 14 and 16 together with the conductive connecting cable 32. The primary winding 29 and the secondary winding 30 generally are coupled by the portion of stationary arm 16 which extends through core opening 42, adjacent the internal sections 48 of the primary winding. Preferably, arms 14 and 16 each have a 20 mm ×20 mm square cross-section. Indeed, due to the thickness of arms 14 and 16, stationary arm 16 provides the main supporting frame structure for the apparatus 10. Transformer core 28 and the primary winding 29 thus are supported on the stationary ar 16 which passes through the opening 42 in the core. Arm 14 moves about pivot point B. Conveniently, the arms can have a length of 550 mm. Conductive connecting cable 32 comprises 0.155 mm diameter copper wire wound to have a 200 mm$^2$ cross-section. This cable 32 is electrically connected to the copper arms 14 and 16, preferably by solder containing 90% tin and 10% lead, to hold the copper arms about 100 mm apart.

Figure 6:
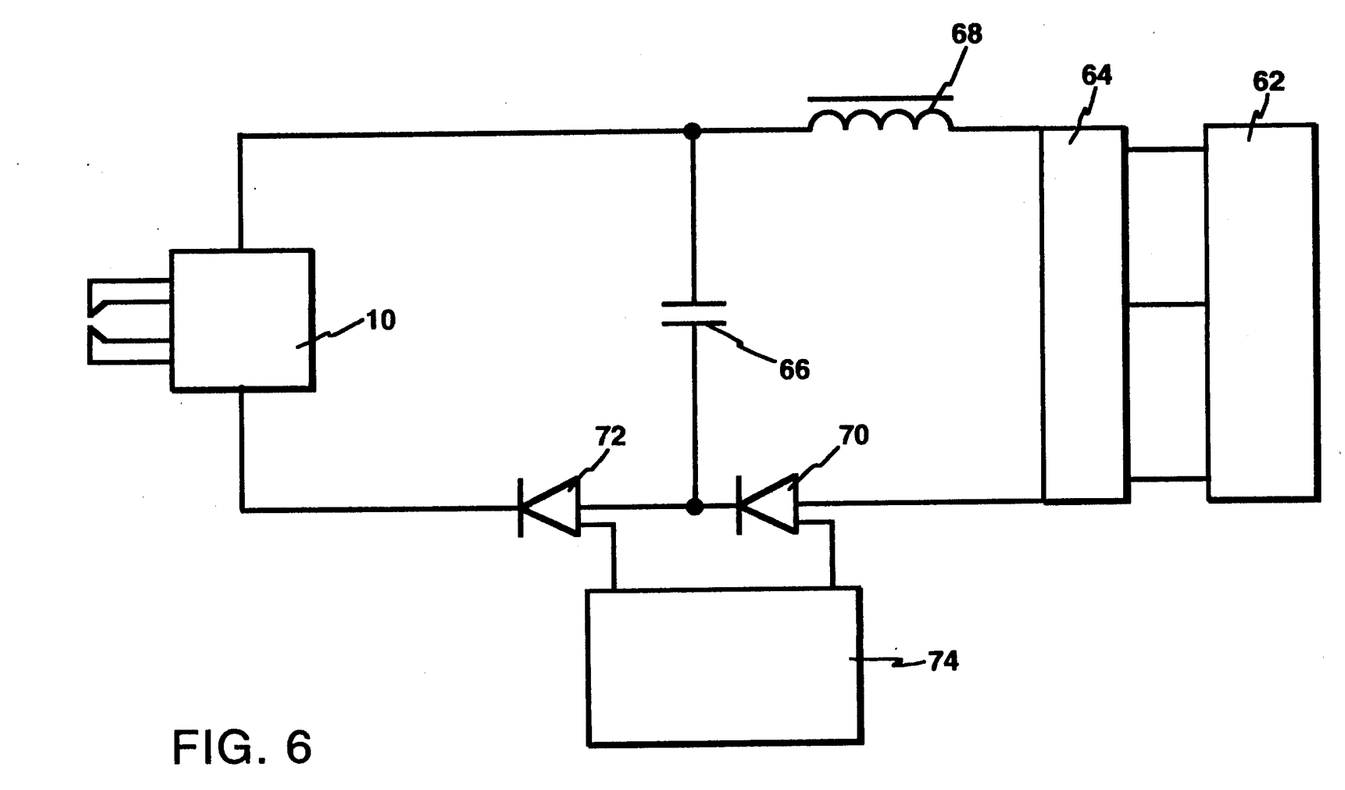
FIG. 6 is a schematic circuit diagram of the welder power system according to one embodiment of the present invention.

A power system for the welding apparatus will be described in conjunction with FIG. 6. The welding unit 10 is connected to a 220 volt power supply 62 through a capacitor-based energy storage circuit. The output of the circuit's power supply 62 is rectified by conventional rectifying means 64. The output of the rectifying means 64 charges a capacitive means, such as storage capacitor 66. An inductive means, such as inductor 68, is connected to one terminal of capacitor 66 and acts as a choke for the circuit, restricting the amount of electricity charging the capacitor 66. This terminal of capacitor 66 is also connected to one terminal of the welder 10. A first electrical switching means 70 connects the other terminal of capacitor 66 to a second terminal of the rectifying means 64. The electrical switching means 70 prevents current from flowing back into the rectifying means 64. A second electrical switching means 72, connected in series with the first electrical switching means 70, connects the second terminal of the capacitor 66 to the welding device 10 and prevents energy from being prematurely transferred to the transformer located in the welding device. As shown in FIG. 6, the capacitive means 66 is connected at a junction between the first switching means 70 and the second switching means 72, and the capacitive means 66 is also connected between the switching means 70, 72 and the inductive means 68. When capacitive means 66 has stored the desired charge, an electronic control element 74 opens the second electrical switching means 72, allowing energy stored in the capacitor to flow to the transformer for performing the welding operation. After the welding operation is complete, the electronic system 74 closes the second electrical switching means 72, and the capacitor charging process is repeated.

The spot welding apparatus 10, constructed as described above in accordance with the present invention, provides a potential difference of 2 volts between its electrodes 18 and 20 when a 220 volt, 50 Hz input energy is applied through power cable 26. Spot welding apparatus 10 is contemplated to operate at power in the range of 0.5 kw to 10 kw. It is also contemplated that the apparatus is compatible for operation in a frequency range from about 50 Hz to about 400 Hz. When using the apparatus for spot welding, 1 kilowatt hour of electrical input energy at 220 V, 50 Hz has been found sufficient to weld approximately one thousand 2×3 mm$^2$ spots. In the exemplary embodiment described above, a test for breakdown from the primary winding to the secondary winding gave satisfactory results at 6,000 volts. The spot welding apparatus 10 described in the foregoing can be implemented to have a total weight of about 22 kg.

In operation, metal work pieces to be welded together are placed between the two electrodes 18 and 20 and in contact with electrode 20. With the power supply source connected as shown in FIG. 6, the transformer creates a potential difference between electrodes 18 and 20. Electrode 18 is lowered into pressure contact with the work pieces in order to complete an electrical circuit producing current to weld the pieces together.

FIGS. 7 through 10 show other embodiments in accordance with the present invention. In the embodiments of FIGS. 7 through 10, the electrodes have been configured to accommodate various sizes and shapes of different work pieces. Otherwise, it is understood that a similar transformer structure, as disclosed in connection with the embodiment of FIGS. 1 and 2, is preferred for use in each of the embodiments of FIGS. 7 through 10.

Figure 7:
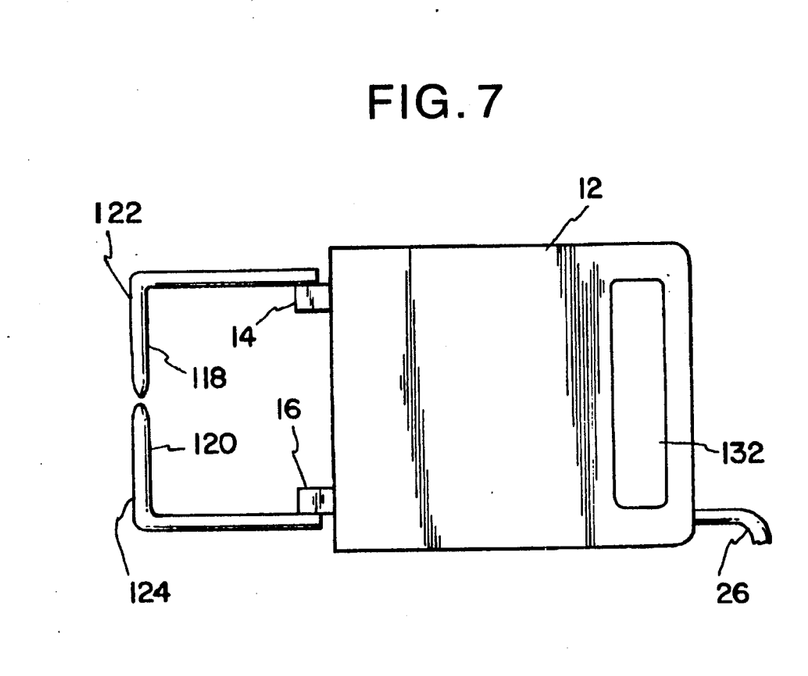
FIGS. 7–10 are side elevational views of different embodiments of the welding apparatus in accordance with the invention.
Figure 8:
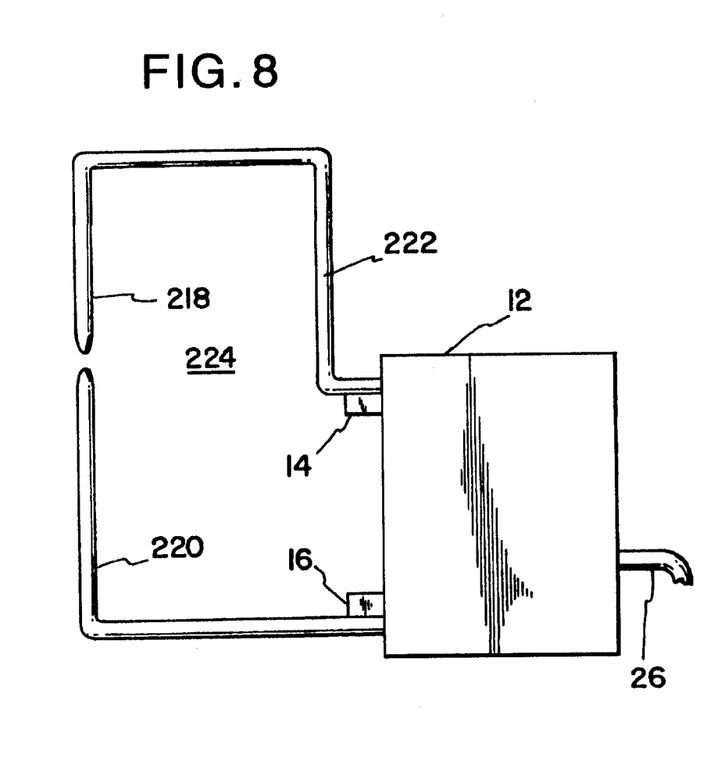
Figure 9:
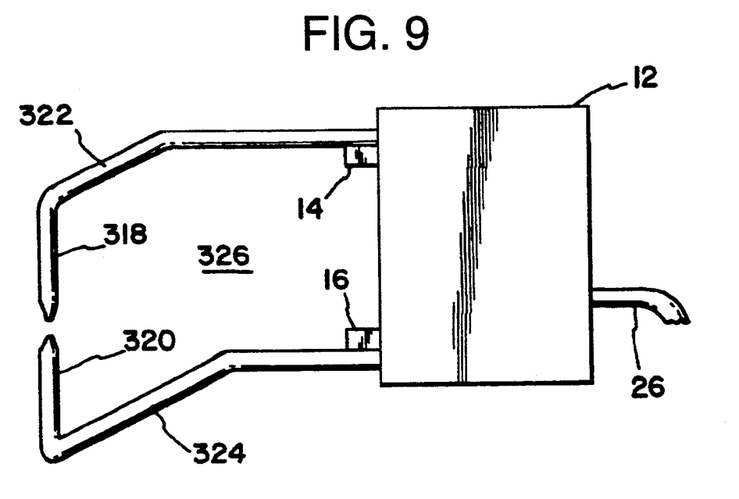

In each of the embodiments of FIGS. 7 through 9, the movable and stationary arms protrude out of the body 12 for only a short distance and rather the electrodes are made longer. For instance, in the embodiment of FIG. 7, electrodes 118 and 120 comprise elongated, bent members 122 and 124. The embodiment of FIG. 7 also comprises a handle 120 provided with its case 12. Of course, such a handle 120 could be furnished with any of the embodiments disclosed herein.

In the embodiment of FIG. 8, the electrode 218 is provided with a vertical extending portion 222 to provide a larger throat 224. The widened throat 224 permits the electrodes 218 and 220 to receive a larger work piece. In the embodiment of FIG. 9, the welding throat 326 has been configured by electrodes 318 and 320 provided with parallel portions 322 and 324. It is thus understood that the welding throat and the location of the gap between the electrodes may be made to suit the particular requirements of different work pieces. In each of the embodiments, the electrodes may be bolted to the copper arms 14 and 16, or electrically connected thereto by other suitable means.

Figure 10:
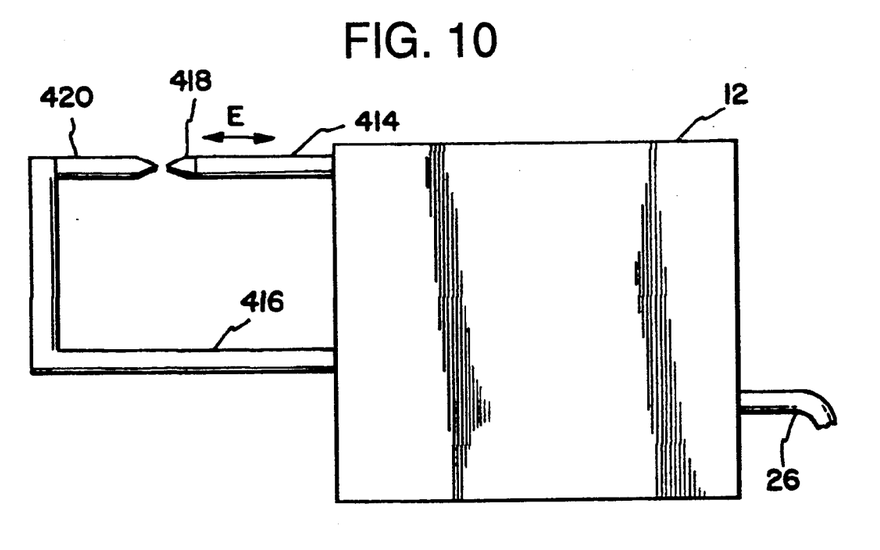

FIG. 10 shows a welding apparatus in accordance with the invention wherein the movable copper arm 414 and its associated electrode 418 are displaceable in the horizontal direction as represented by arrow E. Electrode 420 mounted on arm 416 is stationary. This electrode configuration accommodates insertion of the work piece in the vertical direction between the electrodes 418 and 420.

Figure 11:
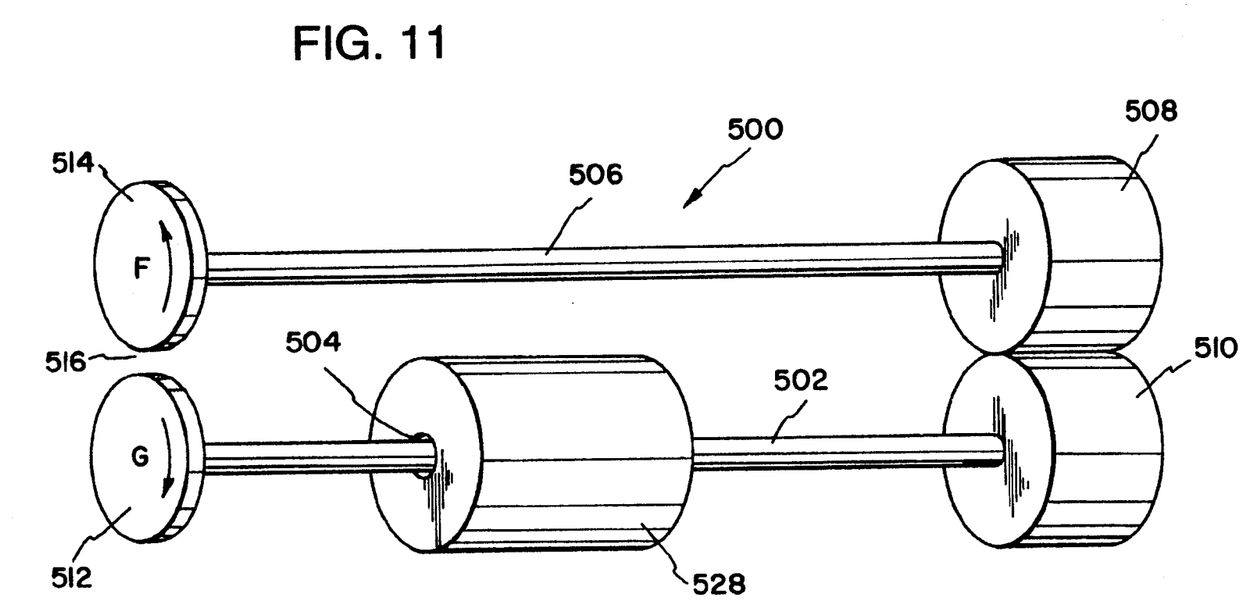
FIG. 11 is a perspective view of an arrangement for providing a linear welding apparatus in accordance with the present invention.

An arrangement 500 for providing a line welding apparatus in accordance with the present invention is depicted in FIG. 11. In the embodiment of FIG. 11, the transformer core 528 likewise is constructed in the manner described in connection with the embodiment of FIGS. 1 and 2 and as depicted in FIGS. 3 and 4. Arrangement 500 has a first rod member 502 which passes through the opening 504 in the toroidal core 528. Another rod 506 is electrically connected to rod 502 by means of elements 508 and 510 to form the single-turn secondary winding for the arrangement 500. Preferably, threads 502 and 506 are made of copper, however, other conductor materials may be utilized.

Elements 508 and 510 are made of electrically conductive material and are maintained in contact with each other as the rods 502 and 506 are rotated. Elements 508 and 510 may be provided to a toothed engagement (not shown). However, electrical contact between elements 508 and 510 could be maintained by any other conventional means.

Disk-like electrodes 512 and 514 are located at the free ends of rods 502 and 506. Electrodes 512 and 514 are spaced apart from each other by a gap 516 across which is created an electrical potential for effecting welding. Electrodes 512 and 514 are rotated by the rods 502 and 504 as illustrated by arrows F and G. As is understood, the work pieces to be linearly welded together are fed into the gap 516 between the electrodes 512 and 514. When contact is made between the work pieces and the electrodes 512 and 514, the work pieces move in the direction of rod rotation. As the work pieces advance between and in contact with the electrodes 512 and 514, the work pieces are linearly welded together.

Figure 12:
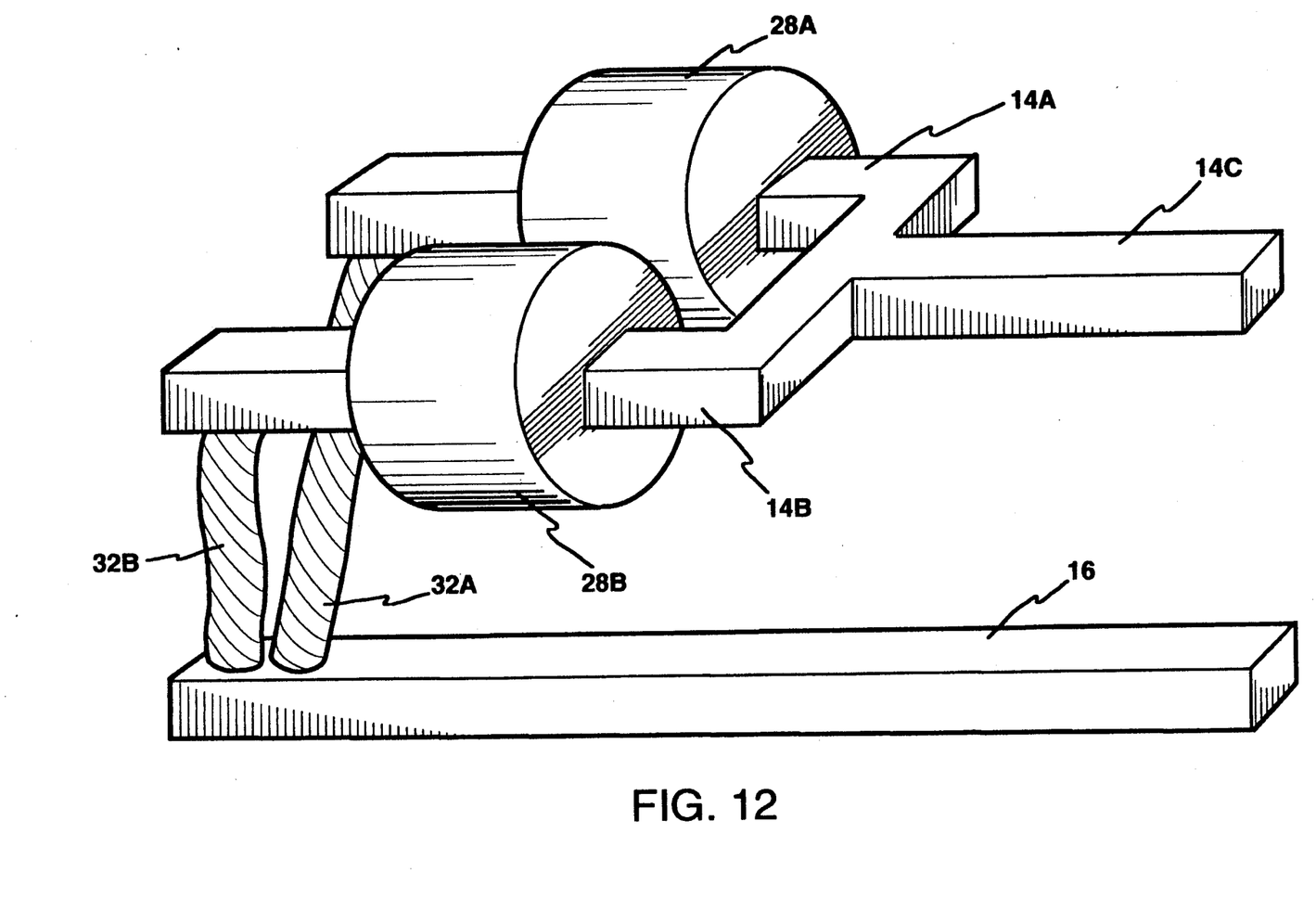
FIGS. 12 and 13 are side elevational views of different embodiments of the welding apparatus in accordance with the invention, wherein multiple transformer cores are used.

Other embodiments of the invention may incorporate multiple transformer cores 28 of the type described in the foregoing with respect to FIGS. 2-5. FIG. 12 shows an embodiment comprising a parallel arrangement of two cores 28A and 28B and two secondary windings. Three arm sections 14A, 14B and 14C are provided for mounting of elements 28A and 28B. Two wound conductive connecting cables 32A and 32B conductively connect arm sections 14A and 14B with an arm 16. The cores 28A and 28B surround separate arm sections 14A and 14B, respectively. Arm section 14C provides an electrode tip section. This type of embodiment is particularly advantageous for welding high resistivity materials.

Figure 13:
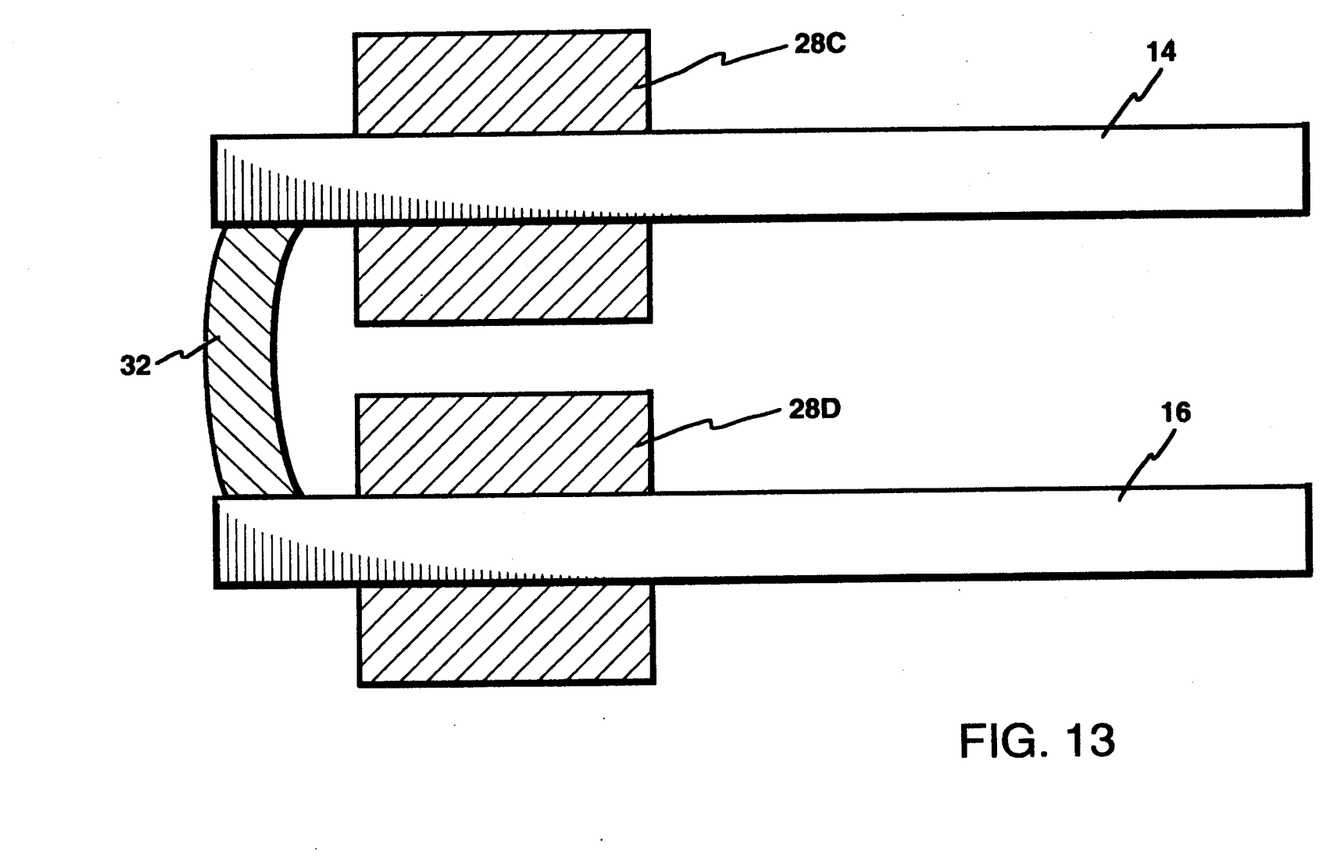

Yet another embodiment of the invention incorporating a series arrangement of multiple transformer cores in accordance with the present invention is shown in FIG. 13. Again, the transformer cores are of the type described above with respect to FIGS. 2-5. In the embodiment of FIG. 13, core 28C surrounds arm 14 while core 28D surrounds arm 16. A conductive connecting cable 32 electrically joins the two arms.

While the invention has been described in conjunction with particular embodiments, various modifications may be made without departing from the scope of the invention as defined in the appended claims.

What Is Claimed Is

1. A welding apparatus comprising:
a casing having electrically insulating walls;
first and second welding electrodes;
a secondary winding means which connects the welding electrodes;
a plurality of toroidal cores; and
a corresponding plurality of primary windings forming a corresponding plurality of welding transformer means with the secondary winding means and the primary windings,
each of the toroidal cores comprising a grain-oriented silicon steel material coiled with an insulating material to provide an axial passage therethrough,
each of the primary windings having turns surrounding at least a portion of a core associated therewith to provide external sections adjacent outer walls of its associated core and internal sections adjacent inner walls of its associated core,
the secondary winding means including a first section connected to the first welding electrode, a second section connected to the second welding electrode, a wound section having a winding connecting the first and second sections, a third section passing through the axial passage of one of the cores, adjacent the internal sections of the primary winding turns thereof, and a fourth section passing through the axial passage of another of the cores, adjacent the internal sections of the primary winding turns thereof, the secondary winding means forming a single turn about each of the cores.

2. A welding apparatus as claimed in claim 1, wherein the third and fourth sections each connect in parallel to the first section connected to the first welding electrode, and wherein the secondary winding means comprises two wound sections which connect each of the third and fourth sections to the second section.

3. A welding apparatus as claimed in claim 1, wherein the first and third sections are integrally connected, and the second and fourth sections are integrally connected, and the wound section connects the integrally-connected sections together.

4. A welding apparatus as claimed in claim 1, wherein the silicon steel material has a magnetic induction of about 1.7 tesla in a rolling direction thereof and a magnetic induction of about 1.0 tesla in the direction transverse to its rolling direction.

5. A welding apparatus as claimed in claim 1, wherein the secondary winding means provides a frame member for supporting the toroidal cores and primary windings within the casing.

6. A welding apparatus as claimed in claim 1, wherein the wound section of the secondary winding means comprises a cable means wound from copper wire to have a cross-sectional area of about 200 mm$^2$.

7. A welding apparatus as claimed in claim 6, wherein each of the arm sections has a cross section of about 20 mm by 20 mm and the copper wire forming the cable means has a diameter of about 0.155 mm$^2$.

8. A welding apparatus as claimed in claim 1, wherein each primary winding comprises 110 turns of a copper strip having a thickness of about 1 mm and a width of about 3 mm.

9. A welding apparatus as claimed in claim 1, wherein the electrode comprise point electrodes.

10. A welding apparatus as claimed in claim 1, wherein the electrodes comprise disk electrodes.

11. A welding apparatus as claimed in claim 1, wherein each associated core and primary winding are coated with an insulating lacquer and are encased within an electrical insulating means.

12. A welding apparatus as claimed in claim 11, wherein each electrical insulating means comprises a first tubular member disposed within the core axial passage, a second tubular member axially enclosing the core in concentric relationship with the first tubular member, and end walls connecting the first and second tubular members to encase each associated core and primary winding.

13. A welding apparatus comprising:
a welding unit, the welding unit having a casing with electrically insulating walls;
first and second welding electrodes;
a welding transformer disposed within the casing and including a toroidal core comprising a grain-oriented silicon steel material coiled with an insulating material, a primary winding having turns surrounding at least a portion of the core, and a secondary winding means including a first arm section connected to the first welding electrode, a second arm section connected to the second welding electrode, and a wound section having a winding connecting the first and second arm sections; and
a power system means including
a rectifying means,
inducive means connecting the rectifying means to the welding unit,
electrical switching means connecting the rectifying means to the welding unit,
capacitive means connected between the inductive means and the switching means, and
control means for controlling conditions of the first and second electrical switching means.

14. A welding apparatus as claimed in claim 13, wherein the switching means comprises first and second electrical switches connected in series.

15. A welding apparatus as claimed in claim 14, wherein the capacitive means is connected at a junction between the first and second electrical switching means and the first and second switching means each comprises a thyristor.

16. A welding apparatus as claimed in claim 13, wherein the apparatus comprises another toroidal core and another primary winding, and the secondary winding means further comprises a third arm section passing through the axial passage of one of the cores, and a fourth arm section passing through the axial passage of the other of the cores.

17. A welding apparatus as claimed in claim 16, wherein the third and fourth arm sections each connect in parallel to the first arm section connected to the first welding electrode, and wherein the secondary winding means comprises two wound sections which connect each of the third and fourth arm sections to the second section.

18. A welding apparatus as claimed in claim 16, wherein the first and third arm sections are integrally connected, and the second and fourth arm sections are integrally connected, and the wound section connects the integrally-connected arm sections together.

19. A power supply means for a welding apparatus which includes first and second welding electrodes, a welding transformer having a toroidal core comprising a grain-oriented silicon steel material coiled with an insulating material, a primary winding having turns surrounding at least a portion of the core, and a secondary winding including a first arm section connected to the first welding electrode, a second arm section connected to the second welding electrode, and a wound section having a winding connecting the first and second arm sections, said power supply means comprising:
   rectifying means,
   inductor means,
   first electrical switching means,
   a capacitor means having a first terminal which is connected to a first terminal of the rectifying means through the inductor means, and which is connected to a first terminal of the welding apparatus, and a second terminal which is connected to a second terminal of the rectifying means through the first electrical switching means,
   second switching means connecting a second terminal of the capacitor means to a second terminal of the welding apparatus, the first switching means substantially preventing current from flowing into the rectifying means through the second terminal thereof; and
   control means for controlling conditions of the first and second electrical switching means.

20. A power supply means as claimed in claim 19, wherein one of the first and second electrical switching means comprises a thyristor switch.

* * * * *